(12) United States Patent
Irie

(10) Patent No.: US 9,096,266 B2
(45) Date of Patent: Aug. 4, 2015

(54) DRIVER ASSISTING SYSTEM FOR OPTIMIZING CURVE TRAVERSAL

(75) Inventor: Yoshiaki Irie, Chiryuu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 13/522,134

(22) PCT Filed: Jan. 15, 2010

(86) PCT No.: PCT/JP2010/050408
§ 371 (c)(1),
(2), (4) Date: Jul. 13, 2012

(87) PCT Pub. No.: WO2011/086684
PCT Pub. Date: Jul. 21, 2011

(65) Prior Publication Data
US 2012/0290173 A1    Nov. 15, 2012

(51) Int. Cl.
*B62D 15/00* (2006.01)
*B62D 15/02* (2006.01)
(Continued)

(52) U.S. Cl.
CPC ............. *B62D 15/025* (2013.01); *B60W 30/10* (2013.01); *B60W 30/16* (2013.01);
(Continued)

(58) Field of Classification Search
CPC .... B62D 15/025; B60W 30/10; B60W 30/16; B60W 50/0097; B60W 50/082; B60W 2550/142; B60W 2550/146; B60W 2550/402; Y02T 10/84
USPC ..................................................... 701/41–44
See application file for complete search history.

(56) References Cited

U.S. PATENT DOCUMENTS 5,172,317 A     12/1992   Asanuma et al.
5,483,453 A *   1/1996    Uemura et al. ............... 701/23
(Continued)

FOREIGN PATENT DOCUMENTS

JP           2 48705        2/1990
JP       2008 129804        6/2008
(Continued)

OTHER PUBLICATIONS

International Search Report issued on Apr. 13, 2010 in PCT/JP10/50408 filed on Jan. 15, 2010.

*Primary Examiner* — Helal A Algahaim
*Assistant Examiner* — Donald J Wallace
(74) *Attorney, Agent, or Firm* — Oblon, McClelland, Maier & Neustadt, L.L.P.

(57) ABSTRACT

To perform appropriate travel control of a vehicle without applying an uncomfortable feeling to a driver, an ideal travel locus, that is a travel locus that becomes a target when travel control of the vehicle is performed, is set, plural guide target points which guide the vehicle when the travel control is performed are set on the ideal travel locus, and when the vehicle is guided to the guide target points, the vehicle is guided by making a degree of influence when the vehicle is guided at the plural guide target points different from each other. With the configuration, in a portion having a low degree of importance on the ideal travel locus, when the vehicle is guided by reducing the degree of influence of the guide target points, since the vehicle is guided in a state that a compelling force is small, the vehicle can be guided without applying an uncomfortable feeling to the driver. Further, in a portion having a high degree of importance on the ideal travel locus, when the vehicle is guided by increasing the degree of influence of the guide target points, since the vehicle is guided by a large compelling force, appropriate travel control of the vehicle can be performed.

9 Claims, 10 Drawing Sheets

(51) Int. Cl.
　　　*B60W 30/10*　　　(2006.01)
　　　*B60W 50/00*　　　(2006.01)
　　　*B60W 50/08*　　　(2012.01)
　　　*B60W 30/16*　　　(2012.01)

(52) U.S. Cl.
　　　CPC ........ *B60W 50/0097* (2013.01); *B60W 50/082* (2013.01); *B60W 2550/142* (2013.01); *B60W 2550/146* (2013.01); *B60W 2550/402* (2013.01); *Y02T 10/84* (2013.01)

(56) References Cited

U.S. PATENT DOCUMENTS

| | | | | |
|---|---|---|---|---|
| 6,138,062 | A * | 10/2000 | Usami | 701/23 |
| 6,169,940 | B1 * | 1/2001 | Jitsukata et al. | 701/23 |
| 6,185,492 | B1 * | 2/2001 | Kagawa et al. | 701/41 |
| 6,675,094 | B2 * | 1/2004 | Russell et al. | 701/301 |
| 7,243,026 | B2 * | 7/2007 | Kudo | 701/301 |
| 8,224,525 | B1 * | 7/2012 | Rapoport et al. | 701/41 |
| 8,457,868 | B2 * | 6/2013 | Tange et al. | 701/116 |
| 2005/0128063 | A1 * | 6/2005 | Isaji et al. | 340/439 |
| 2009/0088966 | A1 * | 4/2009 | Yokoyama et al. | 701/201 |
| 2009/0091475 | A1 * | 4/2009 | Watanabe et al. | 701/41 |
| 2009/0271050 | A1 * | 10/2009 | Niki et al. | 701/1 |
| 2010/0042282 | A1 | 2/2010 | Taguchi et al. | |
| 2010/0211235 | A1 * | 8/2010 | Taguchi et al. | 701/1 |

FOREIGN PATENT DOCUMENTS

| | | |
|---|---|---|
| JP | 2009 61878 | 3/2009 |
| JP | 2009 234560 | 10/2009 |

* cited by examiner

DRIVER ASSISTING SYSTEM FOR OPTIMIZING CURVE TRAVERSAL

FIELD

The present invention relates to a vehicle control device.

BACKGROUND

In conventional vehicle control devices, there has been developed control for causing a vehicle to automatically travel to improve easiness of drive when the vehicle travels and to reduce a load of a drive operation performed by a driver. For example, a travel control schedule creating system described in Patent Literature 1 makes it possible for a vehicle to automatically travel by flexibly corresponding to a change of state of peripheral circumstances while satisfying a travel policy of an own vehicle by performing a travel schedule which includes a travel locus and a speed pattern of the vehicle and further includes a travel locus of a peripheral vehicle.

CITATION LIST

Patent Literature

Patent Literature 1: Japanese Patent application Laid-open No. 2008-129804

SUMMARY

Technical Problem

However, when an automatic travel is controlled based on the travel locus and the like as described above, since a vehicle travels according to a created travel locus regardless of a drive operation performed by a driver, an uncomfortable feeling may be applied to the driver. Further, also when cooperative control of a travel by a drive operation of a driver and travel schedule control, which is performed by creating a travel locus and the like, is performed in place an automatic drive of a vehicle, since a created locus does not always agree with an intention of a driver in many cases, an uncomfortable feeling is also given to a driver in the case. As described above, when travel control of a vehicle is performed by performing a travel schedule, since a travel locus by the travel schedule may be different from an intention of a driver, an uncomfortable feeling may be given to the driver.

An object of the present invention, which was made in view of the circumstances, is to provide a vehicle control device capable of appropriately performing travel control of a vehicle without giving an uncomfortable feeling to a driver.

Solution to Problem

In order to solve the above mentioned problem and achieve the object, a vehicle control device according to the present invention that performs travel control of a vehicle by setting a target travel region that is a travel region that becomes a target when the travel control is performed, wherein a plurality of target positions for guiding the vehicle are set on the target travel region when the travel control is performed, and when the vehicle is guided to the target positions, the vehicle is guided by making a degree of influence when the vehicle is guided at the plurality of the target positions different from each other.

Further, in the vehicle control device, it is preferable that the plurality of the target positions make the degree of influence when steering control of the vehicle is performed different.

Further, in the vehicle control device, it is preferable that the target travel region is set as a target locus that is a locus along which the vehicle travels, and the plurality of the target positions preferably make the degree of influence different in response to a curvature of the target locus at a position where the target position is set.

Further, in the vehicle control device, it is preferable that the plurality of the target positions increase the degree of influence of the target position set to a portion near to a position at which a driver gazes.

Further, in the vehicle control device, it is preferable that the target travel region is set as a target locus that is a locus along which the vehicle travels, and the plurality of the target positions preferably increase the degree of influence at the target position set to a portion where a curvature of the target locus changes.

Further, in the vehicle control device, it is preferable that as a speed of the vehicle becomes fast, the plurality of the target positions increase the degree of influence of the target position set far from the vehicle.

Further, in the vehicle control device, it is preferable that as a road width of a road along which the vehicle travels becomes narrow, the plurality of the target positions increase the degree of influence of the target position set at a position near to a center of the road width.

Further, in the vehicle control device, it is preferable that the plurality of the target positions reduce the degree of influence of the target position set to a portion having a high degree of danger.

Advantageous Effects of Invention

The vehicle control device according to the present invention achieves an effect that appropriate travel control of a vehicle can be performed without applying an uncomfortable feeling to a driver.

BRIEF DESCRIPTION OF DRAWINGS

FIG. 8-1 is a conceptual view when travel control of a vehicle is performed by a conventional vehicle control device.

FIG. 8-2 is an explanatory view illustrating a state that the vehicle more approaches a control limit than FIG. 8-1.

FIG. 8-3 is an explanatory view illustrating a state that control is performed on the control limit at the time of control in the conventional vehicle control device.

FIG. 8-4 is an explanatory view illustrating a state that the control limit is exceeded at the time of control in the conventional vehicle control device.

FIG. 9-1 is a conceptual view when travel control of a vehicle is performed by the vehicle control device according to the embodiment.

FIG. 9-2 is an explanatory view illustrating a state that the control limit is detected by the vehicle control device according to the embodiment.

FIG. 9-3 is an explanatory view illustrating a state that the control limit has been detected by the vehicle control device according to the embodiment.

FIG. 9-4 is an explanatory view illustrating a state that control is performed within a range of the control limit by the vehicle control device according to the embodiment.

DESCRIPTION OF EMBODIMENT

An embodiment of a vehicle control device according to the present invention will be explained below in detail based on the drawings. Note that the present invention is not limited by the embodiment. Further, the components in the embodiment include components that can be replaced by a person skilled in the art as well as are easy or include substantially same components.

Embodiment

Figure 1:
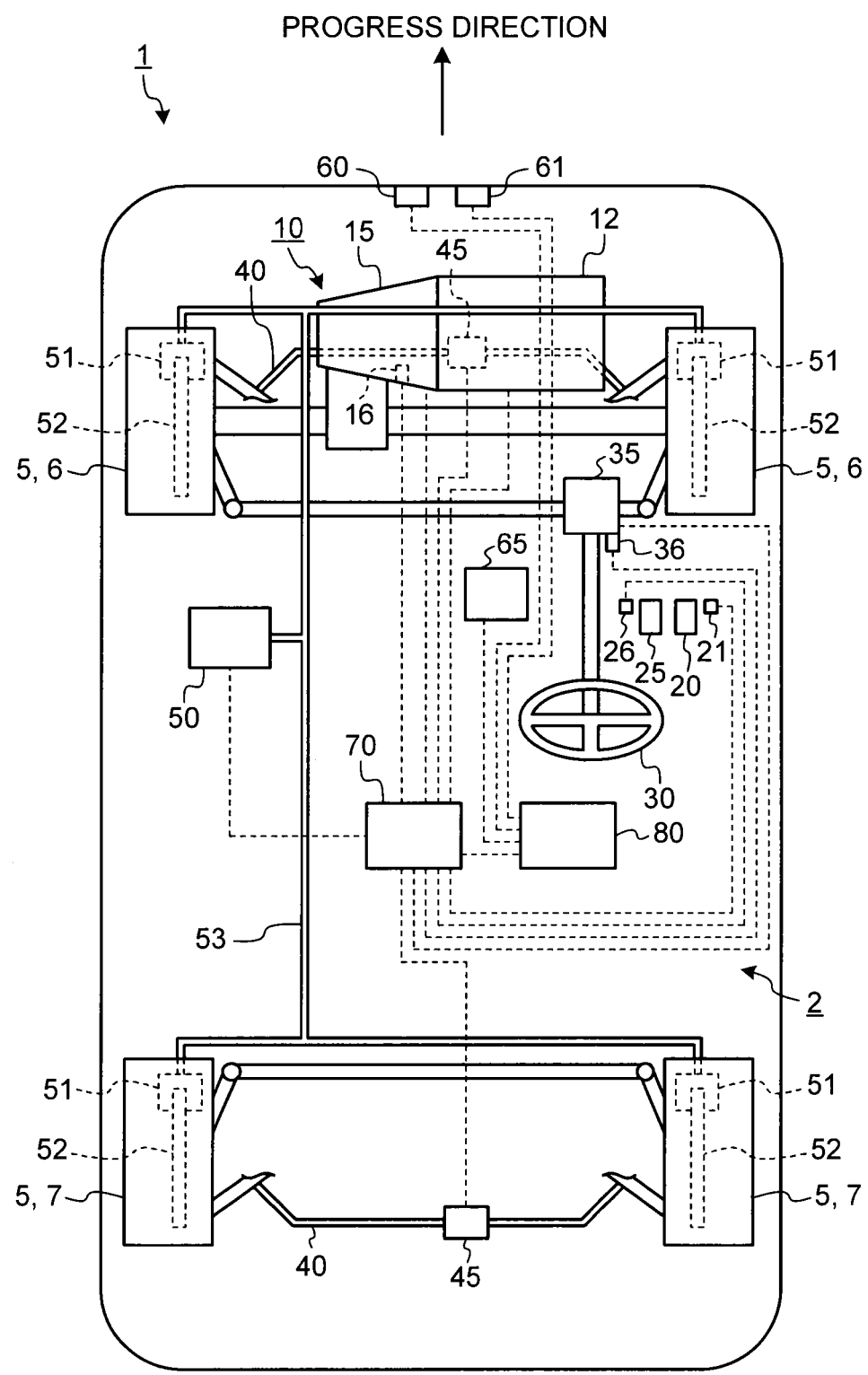
FIG. 1 is a schematic view of a vehicle provided with a vehicle control device according to an embodiment of the present invention.

FIG. 1 is a schematic view of a vehicle provided with a vehicle control device according to an embodiment of the present invention. A vehicle 1 including a vehicle control device 2 according to the embodiment is mounted with an engine 12 which is an internal combustion engine as a power source and can travel by power of the engine 12. The engine 12 is connected with an automatic transmission 15 which is an example of a transmission device and power generated by the engine 12 can be transmitted to the automatic transmission 15. The automatic transmission 15 has plural gear stages having a different transmission gear ratio, and power shifted by the automatic transmission 15 is transmitted to right and left front wheels 6, which are provided as drive wheels of wheels 5 disposed to the vehicle 1 via a power transmission path, and thereby the vehicle 1 can travel. As described above, devices such as the engine 12 and the automatic transmission 15, which can transmit a drive force to the front wheels 6 that are the drive wheels, are provided as a drive device 10.

Among those described above, the automatic transmission 15 is provided with a vehicle speed sensor 16 which is a vehicle speed detecting means capable of detecting a vehicle speed by detecting a revolution speed of an output shaft (illustration is omitted) of the automatic transmission 15. Further, the drive device 10 disposed as described above is provided with a clutch (illustration is omitted) which switches between transmission and shut-off of the power generated by the engine 12 to the front wheels 6 by switching between engagement and disengagement.

Further, the vehicle 1 is provided with an accelerator pedal 20 and a brake pedal 25 that are used when a driver performs a drive operation and further is provided with an accelerator open degree sensor 21 and a brake sensor 26 which detect operation amounts of the pedals.

Note that although the vehicle 1 having the vehicle control device 2 according to the embodiment is a so-called front wheel drive vehicle in which power generated by the engine 12 is transmitted to the front wheels 6 and a drive force is generated by the front wheels 6, the vehicle 1 may be of a drive type other than the front wheel drive such as a rear wheel drive in which a drive force is generated by rear wheels 7, and a four wheel drive in which a drive force is generated by all of the wheels 5. Further, the engine 12 may be a reciprocating type spark ignition internal combustion engine or may be a reciprocating type compression ignition internal combustion engine. Further, the drive device 10 may use a power source other than the internal combustion engine as the power source and may be an electric type drive device 10 which uses a motor as the power source or may be a hybrid type drive device 10 which uses both the engine 12 and the motor.

The front wheels 6 are provided as the drive wheels and are also provided as wheels to be steered, and thus the front wheels 6 are provided so as to be able to be steered by a steering wheel 30 which is used by the driver when the driver performs a drive operation. The steering wheel 30 is connected to an EPS (Electric Power Steering) device 35 that is an electric power steering device and is disposed so as to be able to steer the front wheels 6 via the EPS device 35. Further, the EPS device 35 disposed as described above is provided with a steering angle sensor 36 that is a steering angle detecting means for detecting a steering angle that is a rotation angle of the steering wheel 30. Further, the front wheels 6 are provided so as to be able to be steered by a VGRS (Variable Gear Ratio Steering) that is a gear ratio variable steering which can change a steering gear ratio of steering in response to a vehicle speed and a steering angle.

Further, disposed in the vicinity of the respective wheels 5 are wheel cylinders 51, which are operated by hydraulic pressure, and brake discs 52, which are provided in combination with the wheel cylinders 51 as well as rotate integrally with the wheels 5 when the wheels 5 rotate. Further, the vehicle 1 is disposed with a brake hydraulic pressure control unit 50 which is connected to the wheel cylinders 51 via a hydraulic path 53 and controls hydraulic pressure exerted on the wheel cylinders 51 at the time of brake operation. The brake hydraulic pressure control unit 50 is provided so as to be able to independently control hydraulic pressures with respect to the respective wheel cylinders 51 disposed in the vicinity of the wheels 5. With the operation, the brake hydraulic pressure control unit 50 is provided so as to be able to independently control brake forces of the plural wheels 5.

Further, the vehicle 1 is disposed at a front end with a radar 60, which is an inter-vehicular distance detecting means that detects an inter-vehicular distance between the vehicle 1 and other vehicle 1 traveling in front of the vehicle 1, and a CCD (Charge Coupled Device) camera 61 which is an imaging means which picks up a state in front of the vehicle 1. Further, the vehicle 1 is provided with a car navigation system 65. The car navigation system 65 is a device by which the driver can recognize a current position of his or her vehicle and a peripheral road state by using a GPS (Global Positioning System) and map information stored in a storage unit (illustration is omitted) of the car navigation system 65.

Figure 2:
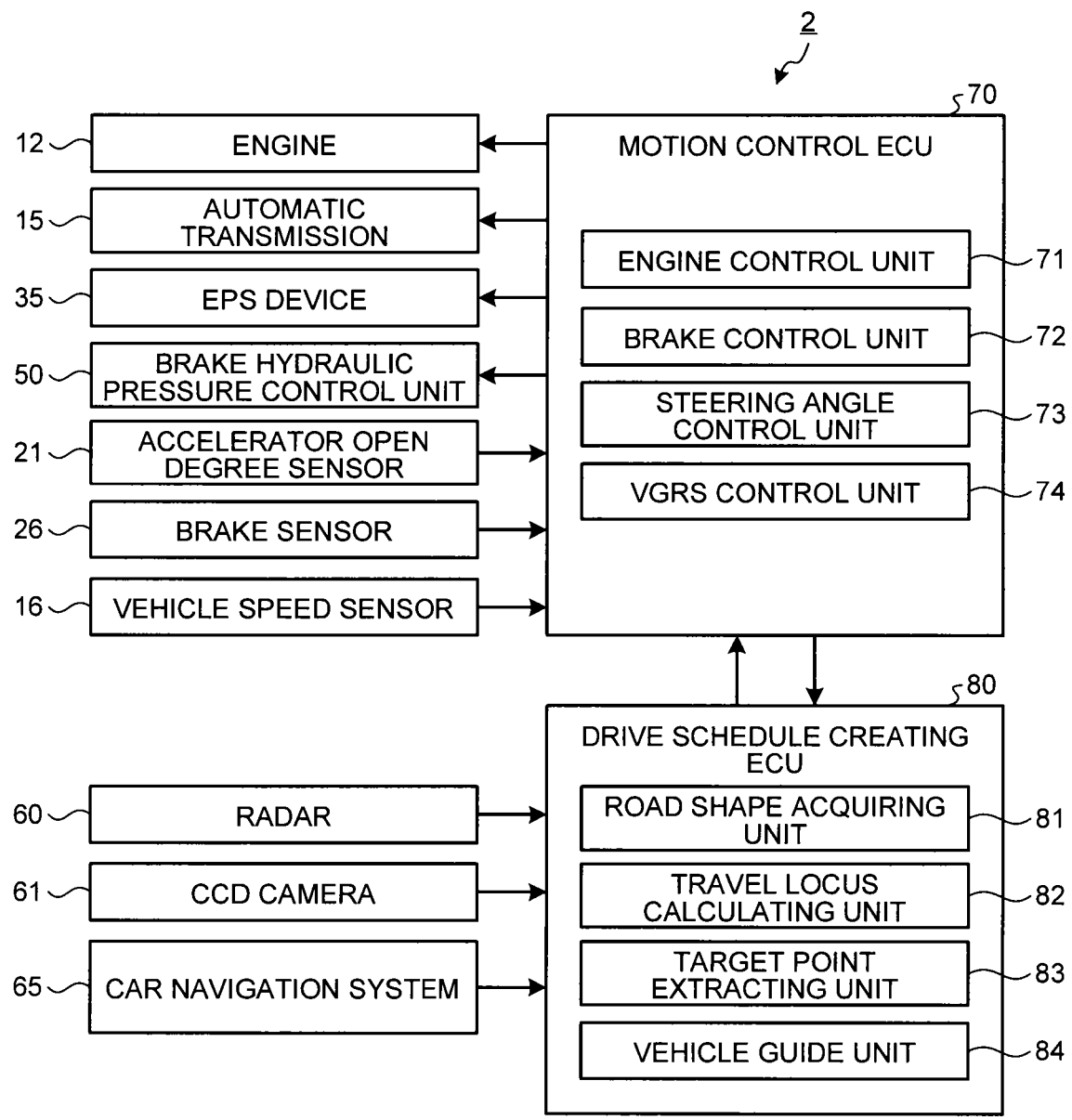
FIG. 2 is a main portion configuration view of the vehicle control device shown in FIG. 1.

FIG. 2 is a main portion configuration view of the vehicle control device shown in FIG. 1. Among the respective configuration devices of the vehicle 1 disposed as described above, the engine 12, the automatic transmission 15, the EPS device 35, and the brake hydraulic pressure control unit 50 which configure the drive device 10 are mounted on the vehicle 1 as well as are connected to a motion control ECU (Electronic Control Unit) 70, which performs a motion control of the vehicle 1, and are operated by being controlled by the motion control ECU 70. Further, the motion control ECU 70 is connected with the accelerator open degree sensor 21, the brake sensor 26, and the vehicle speed sensor 16, and the accelerator open degree sensor 21, the brake sensor 26, and the vehicle speed sensor 16 detect a degree of opening of the accelerator pedal 20 and the brake pedal 25, and a vehicle speed and transmits them to the motion control ECU 70.

Further, the radar 60, the CCD camera 61, and the car navigation system 65 are connected to a drive schedule creating ECU 80 which creates a drive schedule when the vehicle 1 travels, and information obtained by the respective devices is transmitted to the drive schedule creating ECU 80. Further, the motion control ECU 70 and the drive schedule creating ECU 80 are connected with each other and can transmit information and a signal therebetween. Since a hardware configuration of the motion control ECU 70 and the drive schedule creating ECU 80 is a known configuration which includes a processing unit having a CPU (Central Processing Unit) and the like, a storage unit such as RAM (Random Access Memory), and the like, an explanation is omitted.

Among the ECUs, the motion control ECU 70 has an engine control unit 71 which performs an operation control of the engine 12, a brake control unit 72 which controls a brake force by controlling the brake hydraulic pressure control unit 50, a steering angle control unit 73 which controls the EPS device 35, and a VGRS control unit 74 which controls the VGRS by adjusting a steering ratio of the front wheels 6 to a steering angle in response to a vehicle speed and a steering angle.

Further, the drive schedule creating ECU 80 has a road shape acquiring unit 81 which acquires a shape of a road along which the vehicle 1 travels, a travel locus calculating unit 82 which calculates a travel locus when the vehicle 1 travels along the road obtained by the road shape acquiring unit 81, a target point extracting unit 83 which extracts a target point which guides the vehicle 1 when the vehicle 1 is caused to travel along the travel locus calculated by the travel locus calculating unit 82, and a vehicle guiding unit 84 which performs control for guiding the vehicle 1 to the target point extracted by the target point extracting unit 83.

The vehicle control device 2 according to the embodiment is configured as described above, and an operation of the vehicle control device 2 will be explained below. When the vehicle 1 ordinarily travels, the vehicle 1 travels in response to a drive operation of the driver by that the driver operates the steering wheel 30, the accelerator pedal 20, and the brake pedal 25. Further, when the vehicle 1 ordinarily travels, the clutch disposed to the drive device 10 is engaged and is in a state that the clutch can transmit the power generated by the engine 12 to the drive wheel.

Further, the vehicle control device 2 according to the embodiment is disposed so as to assist a drive by the driver when necessary based on an intention of the driver by switching a change over switch (illustration is omitted) and the like so that the vehicle 1 can be caused to travel along a more ideal travel locus. That is, the vehicle control device 2 is disposed so as to be able to perform operation assist control, and when the operation assist control is performed, a drive schedule is created by creating an optimum travel locus in response to a travel state of the vehicle 1, and the like, and travel control of the vehicle 1 is performed by performing corporative control of control for causing the vehicle 1 to travel based on the drive schedule and travel control by the drive operation of the driver.

Figure 3:
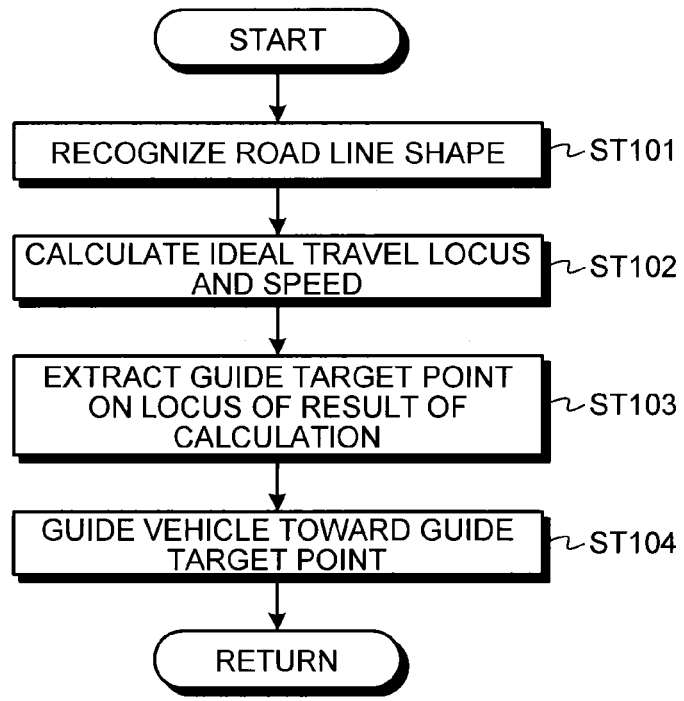
FIG. 3 is an explanatory view when a drive schedule is created in response to a travel state of a vehicle.

FIG. 3 is an explanatory view when the drive schedule is created in response to the travel state of the vehicle. To explain an outline of a procedure of the control when the drive schedule at the time of travel of the vehicle 1 is created and the travel control of the vehicle 1 is performed, first, a road line shape recognition is performed (step ST101). In the road line shape recognition, the road shape acquiring unit 81 provided with the drive schedule creating ECU 80 obtains a shape of a road along which the vehicle 1 travels from image information in front of the vehicle 1 picked by the CCD camera 61 and the map information used in the car navigation system 65.

Next, an ideal travel locus and a speed are calculated (step ST102). The calculation is performed by the travel locus calculating unit 82 provided with the drive schedule creating ECU 80 using a shortest travel locus optimizing algorithm which is previously set and stored in the storage unit of the drive schedule creating ECU 80. In the shortest travel locus optimizing algorithm, first, the ideal travel locus, which is a travel line along which the vehicle 1 can efficiently travel by reducing acceleration and deceleration as much as possible when the vehicle 1 travels along a road, is calculated from a shape of the road obtained by the road shape acquiring unit 81. When, for example, a road has a curve, the ideal travel locus at a position of the curve is calculated based on an out-in-out locus which is ordinarily considered ideal when a vehicle travels along the curve. Further, when a road whose ideal travel locus is calculated has plural curves, the ideal travel locus along which the vehicle 1 can efficiently travel along the plural curves is calculated integrally taking the plural curves into consideration. The ideal travel locus calculated as described above becomes a target travel region which is a travel region that becomes a target when the travel control of the vehicle 1 is performed and is set as target locus that is a locus along which the vehicle 1 travels.

Note that, even when the vehicle 1 travels along a curve, the ideal travel locus may be a locus other than the out-in-out locus and may be, for example, a locus which keeps a center of a traffic lane. As the ideal travel locus, it is preferable to appropriately calculate a proper locus in response to a road along which the vehicle 1 travels at the time and other state.

When the ideal travel locus is calculated, next, a curvature of a curve in the ideal travel locus is calculated, and an upper limit value of a speed is set taking a friction coefficient μ of a road surface and the like into consideration so that friction forces of the wheels 5 are within a friction circle which is a circle showing a limit of a total force of front, rear, left, and right friction forces. In the friction forces of the wheels 5, as a curvature of a road more increases, since a friction force in a lateral direction is likely to become larger and is likely to exceed a limit of the friction circle, an upper limit speed is more restricted in a portion where a curve has a larger curvature in an upper limit value of a speed when the vehicle 1 travels along a curve, that is, in a maximum speed in the curve. In other words, when the curvature of the curve is large, since the friction force is likely to exceed the limit of the friction circle and a side slip is likely to generate, the maximum speed is set at respective points on the ideal travel locus so that the side slip does not generate even in the curve.

Figure 4:
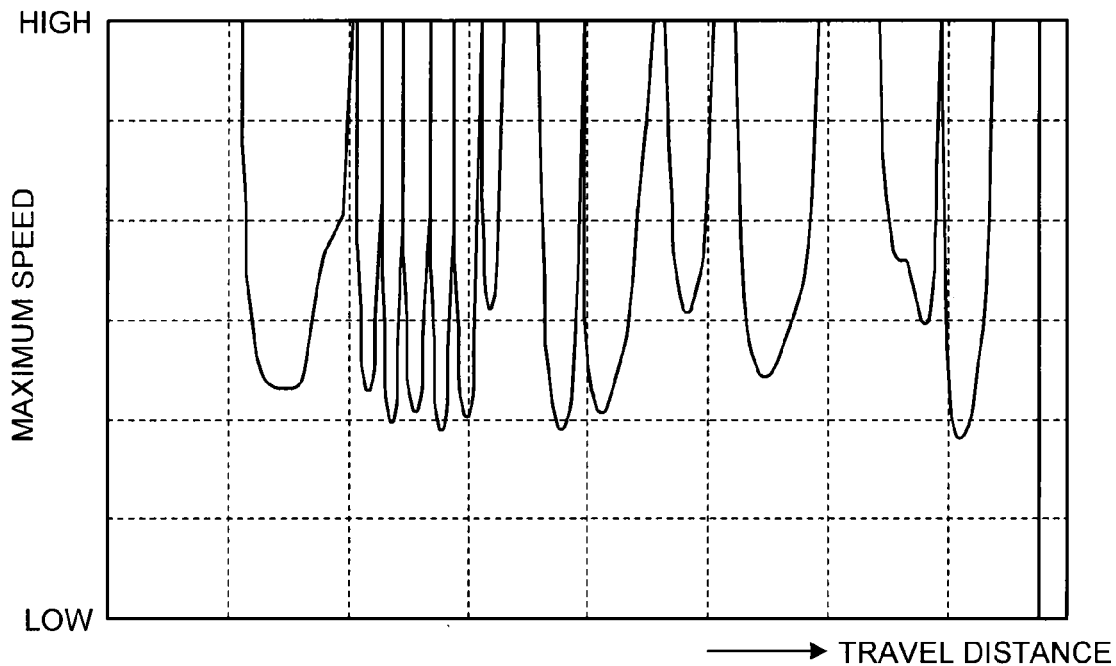
FIG. 4 is an explanatory view of a maximum speed calculated based on a side slip.

FIG. 4 is an explanatory view of the maximum speed calculated based on the side slip. When the maximum speed is set as described above, for example, the ideal travel locus is divided to predetermined minute intervals (distances), and the maximum speed at which the vehicle 1 can travel without generating the side slip when the vehicle 1 travels along the ideal travel locus is calculated to each of the minute intervals. Here, when the maximum speed according to the travel state of vehicle 1 is calculated, the maximum speed is calculated using the following expression (1) which is an equation of motion ordinarily used in a field of travel control dynamics of the vehicle 1, when a speed of the vehicle 1 is shown by V, a maximum speed of the vehicle 1 is shown by $V^2$, a lateral acceleration of the vehicle 1 is shown by Ay, a gravity acceleration by g, a friction coefficient between the wheels 5, a road surface is shown by μ, and a radius when the vehicle 1 turns is shown by R. When the maximum speed at the time the vehicle 1 travels along the ideal travel locus is calculated, the maximum speed is calculated to the respective minute intervals using the expression (1).

$$V^2 = Ay \times R = \mu \times g \times R \quad (1)$$

As described above, when the maximum speed at the time the vehicle 1 travels along the ideal travel locus is calculated, the maximum speed is calculated to a predetermined distance in a progress direction of a road along which the vehicle 1 travels or to a distance according to a vehicle speed. Accordingly, when plural curves exist in the road within the distance, the maximum speed is calculated when the vehicle 1 travels along the ideal travel locus including the plural curves. The maximum speed calculated as described above is shown as a relation between a travel distance in the progress direction using a position at the time on the road as a reference and the maximum speed at a point of each travel distance. While the vehicle 1 is traveling, since a position on the road changes as the vehicle 1 moves, the relation between the travel distance using the position at the time as the reference and the maximum speed is also appropriately updated.

Note that, as to the friction coefficient μ of the road surface which is used when the maximum speed is calculated by the travel locus calculating unit 82, a slip rate of the wheels 5 when a drive force and a brake force are applied to the wheels 5 is calculated based on the vehicle speed sensor 16, a wheel speed sensor (illustration is omitted) which detects a revolution speeds of the wheels 5, and the like, and further the friction coefficient μ of the road surface on which the vehicle 1 is traveling at the time is calculated based on the slip rate, and the slip rate and the friction coefficient μ are stored in the storage unit of the drive schedule creating ECU 80. When the maximum speed at the time the vehicle 1 travels along the road whose curvature has been calculated, the maximum speed is calculated using the friction coefficient μ of the road surface, and the maximum speed at the time of traveling is set.

Figure 5:
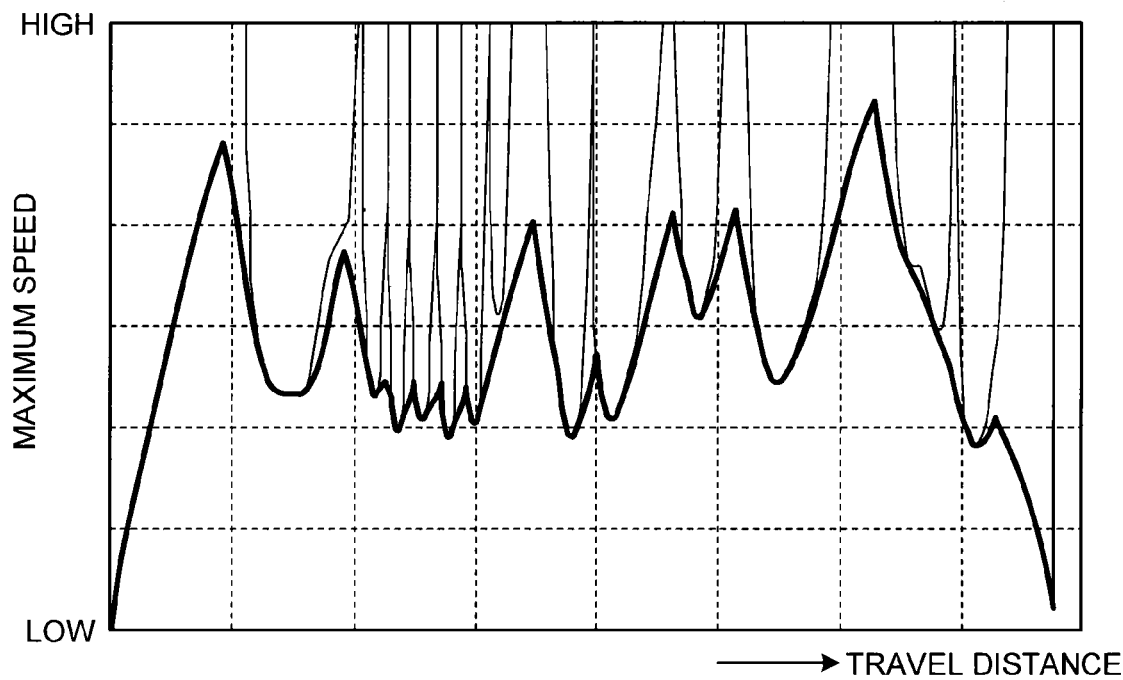
FIG. 5 is an explanatory view of a speed pattern in which a maximum speed is corrected based on characteristics of an actuator.

FIG. 5 is an explanatory view of a speed pattern in which the maximum speed is corrected based on characteristics of an actuator. Next, the speed pattern is set which can be realized by generating the drive force and the brake force when the vehicle 1 travels and controlling the engine 12, the automatic transmission 15, the brake, and the like which are provided as the actuator that adjusts magnitudes of the forces. That is, the maximum speed calculated based on the side slip is corrected based a maximum value of an acceleration and a deceleration which can be actually generated by controlling the engine 12 and the like provided as the actuator when the vehicle 1 is caused to travel. With the operation, the travel locus calculating unit 82 calculates the maximum speed at which no side slip generate at the time of traveling along the ideal travel locus and which can be realized by the vehicle 1 provided with the vehicle control device 2 according to the embodiment.

As to the acceleration and the deceleration which are used when the maximum speed that can be realized is calculated as described above, the maximum value of the acceleration and the deceleration due to a performance of the actuator when the actuator is operated and the maximum value of the acceleration and the deceleration to the friction coefficient μ of the road surface are previously stored in the storage unit of the drive schedule creating ECU 80. The travel locus calculating unit 82 obtains the maximum value of the acceleration and the deceleration to a travel state in respective portions at the time of traveling along the ideal travel locus and the friction coefficient μ of the road surface from the storage unit of the drive schedule creating ECU 80 and corrects the maximum speed based on the maximum value of the obtained acceleration and the deceleration and calculates the speed pattern which can be realized.

Figure 6:
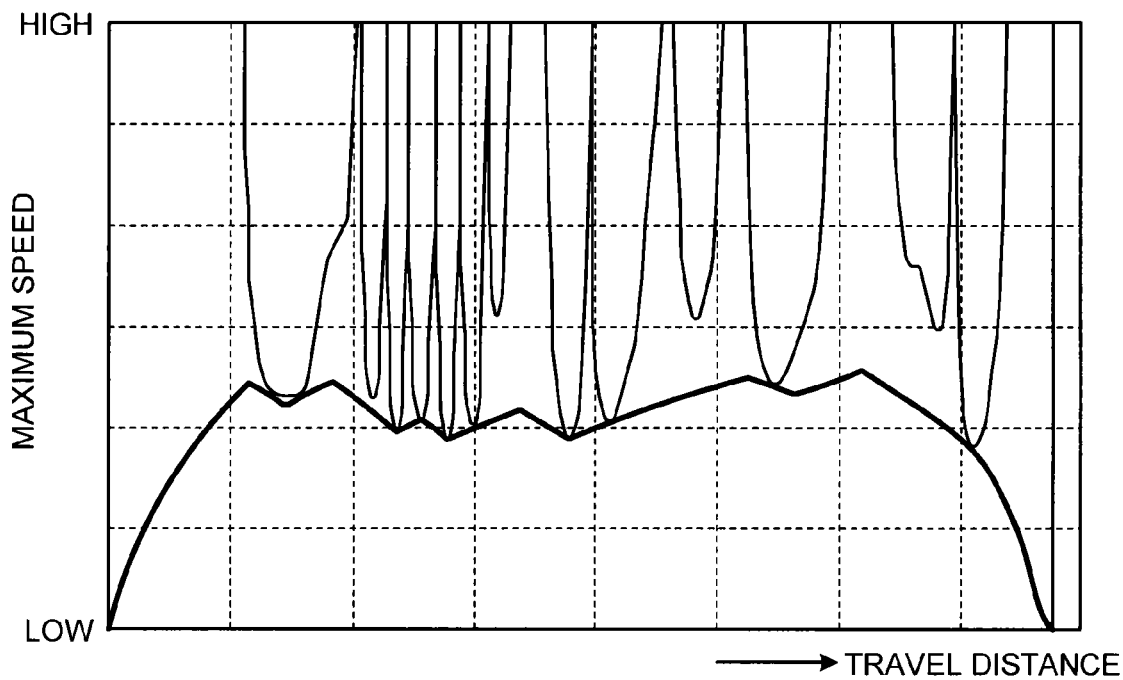
FIG. 6 is an explanatory view of the speed pattern which is corrected in consideration of a fuel economy and riding comfort.

FIG. 6 is an explanatory view of the speed pattern which is corrected in consideration of fuel economy and riding comfort. Note that although the speed pattern, which can be realized when the vehicle 1 provided with the vehicle control device 2 according to the embodiment travels along the ideal travel locus, can be obtained by calculating the speed pattern which can be realized by the actuator as described above, when it is intended to improve the fuel economy, the speed pattern which can be realized by actuator may be further corrected. As shown in, for example, FIG. 6, the speed pattern, in which a speed is less changed in travelling along the ideal travel locus, may be calculated and the travel control of the vehicle 1 may be performed based on the speed pattern. In the case, the speed pattern at the time of traveling along the ideal travel locus is calculated by a wave-like travel which is a travel control in which the drive force is repeatedly turned ON and OFF.

Next, a guide target point is extracted on a locus of a result of calculation (step ST103). Here, the guide target point is a point set as a target position which guides the vehicle 1 when the travel control of the vehicle 1 is performed. That is, the guide target point is positioned on the ideal travel locus and becomes a target when the vehicle 1 is guided for the purpose of causing the vehicle 1 to travel along the ideal travel locus. Further, plural guide target points, which have a different degree of importance, and a different degree of influence when the vehicle 1 is guided to a guide target point, are set on the ideal travel locus. When the ideal travel locus and the speed pattern are calculated, next, the guide target points are extracted by the target point extracting unit 83 provided with the drive schedule creating ECU 80. Note that, here, the degree of influence means a weight of each point when the vehicle 1 is guided to a guide target point. Further, the degree of influence, which is determined in response to a positional relation between the target position and an own vehicle may be applied to the target position.

Figure 7:
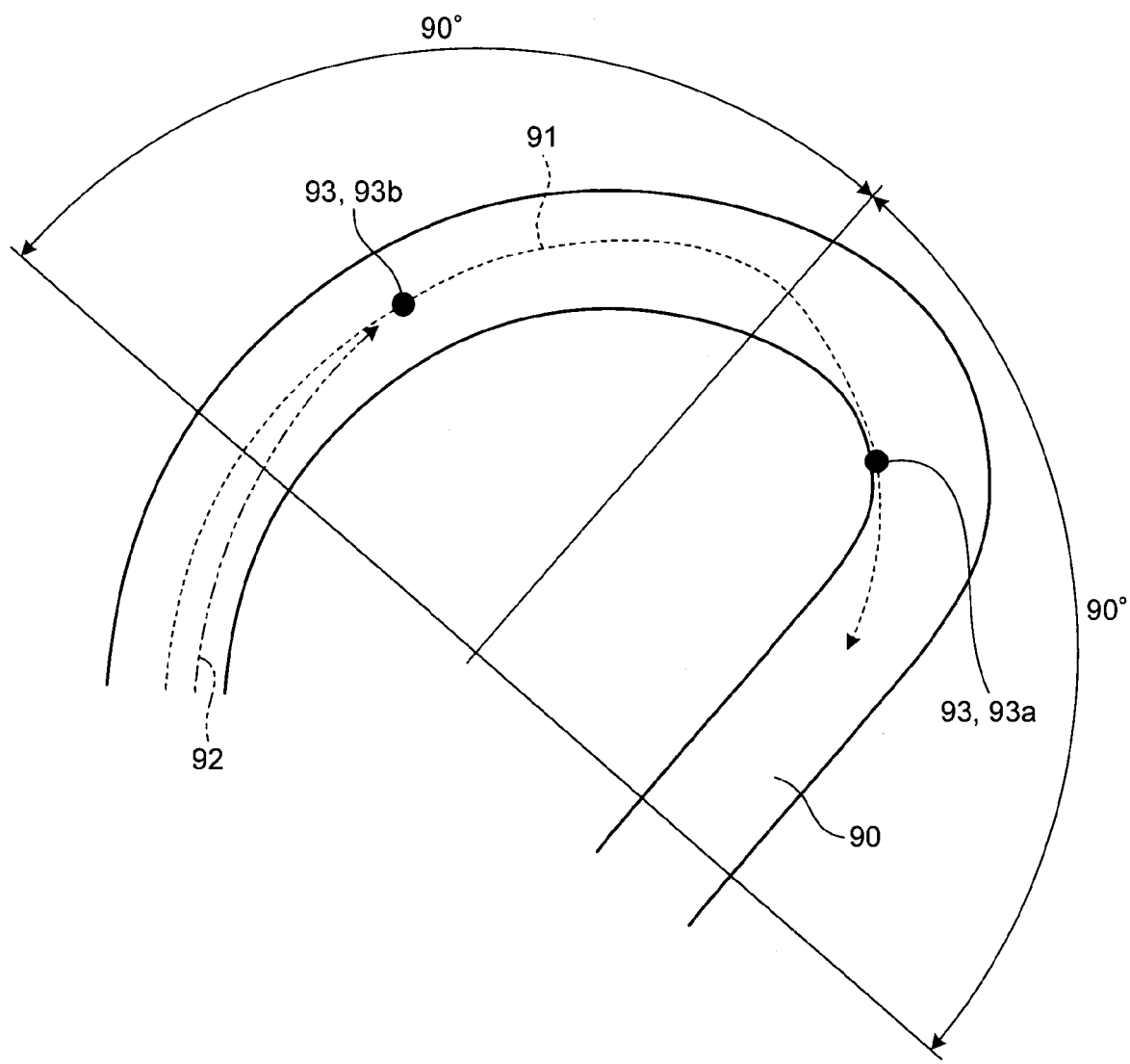
FIG. 7 is an explanatory view when a guide target point is extracted.

FIG. 7 is an explanatory view when a guide target point is extracted. When the guide target point is extracted, first, a road is divided according to a predetermined rule. As an example when the road is divided and the guide target point is extracted, when an explanation is made using FIG. 7, as shown in FIG. 7, when a curve has an angle of 180° or more, the curve is divided at each 90° and a road 90 is divided to two blocks.

When the road 90 is divided, first, an important target point 93a, which is an important guide target point 93 among the plural guide targets points 93, is extracted. The important target point 93a is a point which can be obtained by solving a dynamics model which realizes a travel in a shortest time on the road 90 in which the guide target point 93 is extracted and is a point positioned on an ideal travel locus 91 and becomes important when the vehicle 1 travels along the ideal travel locus 91 in the shortest time. Accordingly, the road in which the ideal travel locus 91 is calculated is a curve as shown in FIG. 7, since the ideal travel locus 91 becomes the out-in-out travel locus, the important target point 93a is set to an inside portion which is a portion important when traveling is performed along the out-in-out locus as described above.

The important target point 93a is the important point when the vehicle 1 travels along the ideal travel locus 91 in the shortest time as described above and becomes a point on the ideal travel locus 91 when an unnecessary consumption of motion energy is suppressed and the vehicle 1 is efficiently turned. Accordingly, when the vehicle 1 is caused to travel along the ideal travel locus 91, a reduction of a load on the wheels 5 and causing the vehicle 1 to pass though the road 90 in which the ideal travel locus 91 is derived in a short time can be realized at the same time by causing the vehicle 1 to pass through the important target point 93a.

Further, when the vehicle 1 has been caused to pass through the important target point 93a, since the load on the wheels 5 can be reduced as described above, when the vehicle 1 travels along the ideal travel locus 91, a degree of safety when the vehicle 1 travels is maximized by causing the vehicle 1 to pass through the important target point 93a. Accordingly, the important target point 93a, which is a guide target point 93 among the plural guide target points 93, is set so that the degree of influence of important target point 93a when the vehicle 1 is guided becomes higher than the other guide target points 93.

To specifically explain the important target point 93a, when the vehicle 1 is decelerated, since a center of gravity moves forward and surface pressure of the front wheels 6 becomes high, a turn performance is increased, whereas when the vehicle 1 is accelerated, since the center of gravity moves rearward and the surface pressure of the front wheels 6 becomes low, the turn performance is reduced. Accordingly, when, for example, a curve is a single curve as shown in FIG. 7, when the vehicle 1 exits from the curve, a portion, which is near to an inside of the curve in a latter half portion of the curve becomes the important target point 93a to permit the vehicle 1 to exit from the curve linearly or in a large curvature. When the vehicle 1 travels along the curve as shown in FIG. 7, the vehicle 1 can travel in a short time as well as in a state that the degree of safety is maximized by that the vehicle 1 passes through the important target point 93a.

As described above, when the important target point 93a among the guide target points 93 is extracted, next, a guide target point 93 other than the important target point 93a is extracted. When the guide target point 93 other than the important target point 93a is extracted, a point at which the vehicle 1 can be easily guided to the important target point 93a is extracted. At the time the vehicle 1 travels along, for example, the curve as shown in FIG. 7, when the important target point 93a is set to a portion on the inside on the out-in-out travel locus, an approach target point 93b which is other guide target point 93 at which the vehicle 1 can be easily guided to the important target point 93a is preferably positioned on an approach locus from in front of a position, where the important target point 93a is viewed, to the important target point 93a. Accordingly, the approach target point 93b is set to a portion on an outside of the out-in-out travel locus on a proximal side of the important target point 93a in the progress direction of the vehicle 1. That is, the approach target point 93b is extracted as a point set on a proximal side of the important target point 93a on the ideal travel locus 91 set by the out-in-out travel locus.

When the approach target point 93b is extracted, for example, an intersection point of a progress path 92 of the vehicle 1 during travelling and the ideal travel locus 91 is extracted as the approach target point 93b. When the progress path 92 of the vehicle 1 during travelling is determined at the time the approach target point 93b is extracted as described above, first, a yaw rate γ of the vehicle 1 is calculated by the following expression (2), when the yaw rate of the vehicle 1 is shown by γ, a vehicle speed at the time is shown by V, a steering angle is shown by δ, a stability factor of the vehicle 1 is shown by the kh, a steering gear ratio is shown by N, and a wheelbase is shown by I.

$$\gamma = V\delta/((1+khV^2) \times Nl) \quad (2)$$

Next, positions (X, Y) of the vehicle 1 to a passed time are calculated by the following expression (3) using the calculated yaw rate γ, when a time is shown by t and an azimuth of the vehicle 1 at the time when the positions (X, Y) of the vehicle 1 at the time t begins to be calculated is shown by θ.

$$(X, Y) = (\int V\cos(\gamma t + \theta)dt, \int V\sin(\gamma t + \theta)dt) \quad (3)$$

With the calculation, since the positions (X, Y) of the vehicle 1 to the passed time when traveling is continued in the travel state at the time can be calculated, a portion where the progress path 92 of the vehicle 1 which can be shown by the positions (X, Y) of the vehicle 1 to the passed time intersects the ideal travel locus 91 is extracted as the approach target point 93b.

When the guide target point 93 is extracted by the target point extracting unit 83, next, the vehicle 1 is guided toward the guide target point 93 (step ST104). The guide of the vehicle 1 is performed by the vehicle guiding unit 84 provided with the drive schedule creating ECU 80. When the vehicle 1 is guided by the vehicle guiding unit 84, a difference between the positions (X, Y) of the vehicle 1 at the time and the guide target point 93 is determined and respective sections of the vehicle 1 are controlled by the motion control ECU 70 in addition to the travel control by a drive operation of the driver so that the difference becomes zero.

To specifically explain the control, first, the vehicle guiding unit 84 determines a difference between the approach target point 93b that is the guide target point 93 positioned on a proximal side in the progress direction of the vehicle 1 among the guide target points 93 and the position of the vehicle 1 at the time. Next, the vehicle guiding unit 84 determines the vehicle speed and the steering angle which can reduce the difference and compares the determined vehicle speed and steering angle with the vehicle speed due to the drive force generated by the drive operation of the driver and the steering angle by the drive operation of the driver. With the comparison, a control amount which is added to a control amount by the drive operation of the driver is calculated so that the vehicle speed and the steering angle, which can reduce the difference between the position of the vehicle 1 at the time and the approach target point 93b, can be obtained. When the control amount to be added is calculated, the vehicle guiding unit 84 transmits the control amount to the motion control ECU 70.

The motion control ECU 70 performs control for adding a predetermined control amount to the control amount based on the drive operation of the driver by controlling the respective sections of the vehicle 1 based on the control amount transmitted from the vehicle guiding unit 84. In the case, the control is performed so that an uncomfortable feeling applied to the driver is reduced as much as possible. In the control, as to the vehicle speed, it is prevented that a speed exceeds a speed assumed by the driver by the drive operation, and when the vehicle speed by the drive operation of the driver is higher than the vehicle speed which can reduce the difference between the position of the vehicle 1 at the time and the approach target point 93b in view of an integral determination of the position and the azimuth of the vehicle 1 at the time and a speed at the approach target point 93b in the speed pattern of the ideal travel locus 91, the drive force is reduced. In the case, the drive force is reduced in a degree at which the uncomfortable feeling is not applied to the driver to thereby reduce the vehicle speed by reducing power generated by the engine 12 by controlling the engine 12 by the engine control unit 71 provided with the motion control ECU 70 and by generating the brake force by controlling the brake hydraulic pressure control unit 50 by the brake control unit 72 provided with the motion control ECU 70. Note that when the drive device 10 is a hybrid type drive device 10 having both the engine 12 and a motor and regenerative braking is possible in deceleration, the vehicle speed may be adjusted making use of the regenerative braking when the vehicle speed is adjusted.

Further, when the steering angle by the drive operation of the driver is different from the steering angle at which the difference between the position of the vehicle 1 at the time and the approach target point 93b can be reduced, the driver is prompted to adjust the steering angle and the VGRS is controlled. When, for example, the driver is prompted to adjust the steering angle, the driver is prompted to change the steering angle from the steering angle at the time via the steering wheel 30 by controlling the VGRS so that the steering angle is changed to a desired direction by controlling the VGRS control unit 74 by the steering angle control unit 73 provided with the motion control ECU 70. With the operation, since the driver performs a steering operation in a direction where rotation torque is applied, an actual steering angle becomes near to a steering angle at which the difference between the position of the vehicle 1 at the time and the approach target point 93b is reduced.

As described above, when the respective sections of the vehicle 1 are controlled by the motion control ECU 70, the vehicle 1 travels in a direction where the difference between the position at the time and the approach target point 93b becomes near to zero and is guided to the approach target point 93b by that the drive force is controlled and that the driver is prompted to perform the drive operation. When the vehicle 1 has reached the approach target point 93b by the guide, the vehicle 1 reaches on the ideal travel locus 91. The ideal travel locus 91 is a locus which permits the vehicle 1 to efficiently travel along the road 90 during traveling, and, in other words, becomes a travel locus which permits the vehicle 1 to easily travel along the road 90 during traveling. Accordingly, when the vehicle 1 has reached on the ideal travel locus 91, since there is a high possibility that the driver performs the drive operation which intends to keep the travel on the ideal travel locus 91, a possibility that the vehicle 1 travels on the ideal travel locus 91 becomes high.

When the vehicle 1 travels on the ideal travel locus 91 as described above, the motion control ECU 70 performs the travel control of the vehicle 1 based on the speed pattern calculated by the drive schedule creating ECU 80. That is, likewise the case that the vehicle 1 is guided to the approach target point 93b, the travel control is performed by controlling the engine 12 by the engine control unit 71 and by controlling the brake hydraulic pressure control unit 50 by the brake control unit 72.

When the vehicle 1 has reached the approach target point 93b, although the vehicle 1 becomes likely to travel along the ideal travel locus 91, when the vehicle 1 does not travel along the ideal travel locus 91 because the vehicle 1 has not reached the approach target point 93b or has passed through the approach target point 93b, the guide control of the vehicle 1 is not performed more than necessary and the travel control is performed in response to the drive operation of the driver.

When the vehicle 1 becomes near to the important target point 93a by that the vehicle 1 has reached the approach target point 93b and has continuously travelled along the ideal travel locus 91 or that the vehicle 1 has become near to the important target point 93a by travelling along the progress path other than the ideal travel locus 91, the vehicle guiding unit 84 performs control for guiding the vehicle 1 to the important target point 93a. In the case, the vehicle 1 is caused to more reliably pass through the important target point 93a by making the degree of influence when steering control and vehicle speed control of the vehicle 1 are performed higher than the case that the vehicle 1 is guided to the approach target point 93b.

To specifically explain the above-mentioned, when the vehicle 1 travels toward the important target point 93a by the drive operation by the driver by that the vehicle 1 travels along the ideal travel locus 91, the vehicle guiding unit 84 does not perform control for separately adding a control amount to the travel control by the drive operation of the driver in order to guide the vehicle 1. Accordingly, the vehicle 1 performs a travel based on the drive operation of the driver, and when the vehicle 1 travels along the ideal travel locus 91 by the drive operation, the travel state is continuously kept.

In contrast, when the vehicle 1 does not travel along the ideal travel locus 91 and does not travel toward the important target point 93a, the control of the respective sections of the vehicle 1 in the motion control ECU 70 is added to the travel control by the drive operation of the driver so that the difference between the position of the vehicle 1 at the time and the important target point 93a becomes zero. Likewise the case that the vehicle 1 is guided to the approach target point 93b, although the vehicle 1 is guided to the important target point 93a by controlling the engine 12 and the EPS device 35 by the motion control ECU 70, in the case, the control is performed so that the difference between the position of the vehicle 1 at the time and the important target point 93a becomes zero more reliably than the case that the vehicle 1 is guided to the approach target point 93b.

When, for example, the vehicle speed is faster than a speed suitable for making the difference between the position of the vehicle 1 at the time and the important target point 93a to zero, although the brake force is generated by reducing power generated by the engine 12 and controlling the brake hydraulic pressure control unit 50, an upper limit of the control amount in the case is made larger than a case when the vehicle 1 is guided to the approach target point 93b.

Further, when the steering angle by the drive operation of the driver is different from a steering angle suitable for making the difference between the position of the vehicle 1 at the time and the important target point 93a to zero, although the driver is prompted to change the steering angle by applying rotation torque from the EPS device 35 to the steering wheel 30, the upper limit of a control amount in the case is made larger than the case when the vehicle 1 is guided to the approach target point 93b.

That is, when the vehicle 1 is guided to the important target point 93a, an allowable amount, which allows that actual travel control of the vehicle 1 is deviated from the travel control by the drive operation, is increased and a prompt amount for prompting the driver to change the travel control is increased by making the upper limit of the control amount added to the travel control by the drive operation larger than a case when the vehicle 1 is guided to a guide target point 93 other than the important target point 93a. With the operation, the vehicle 1 becomes more likely to travel to the important target point 93a than the case when the vehicle 1 is guided to the guide target points 93 other than the important target point 93a regardless of an intention of the driver and thus the vehicle 1 becomes likely to pass through the important target point 93a.

Figures 1, 8:
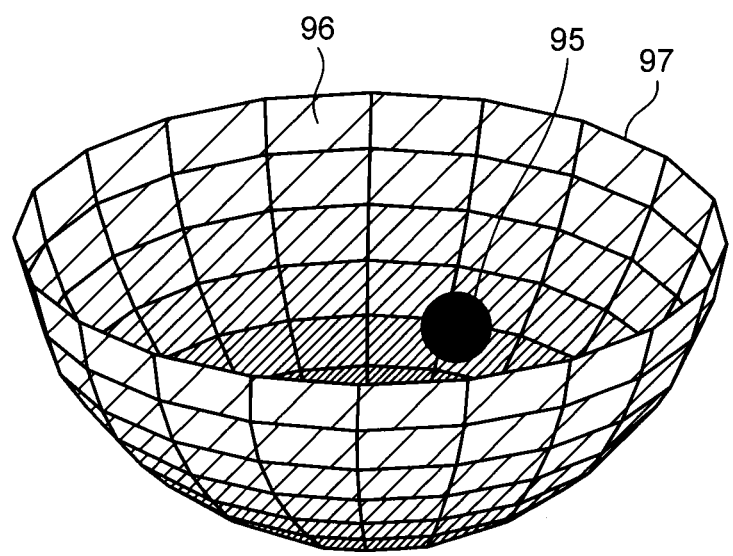
Figures 2, 8:
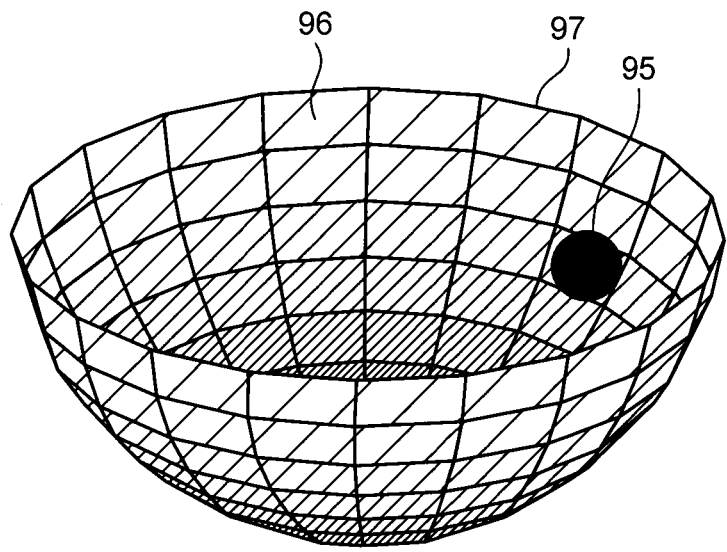
Figures 3, 8:
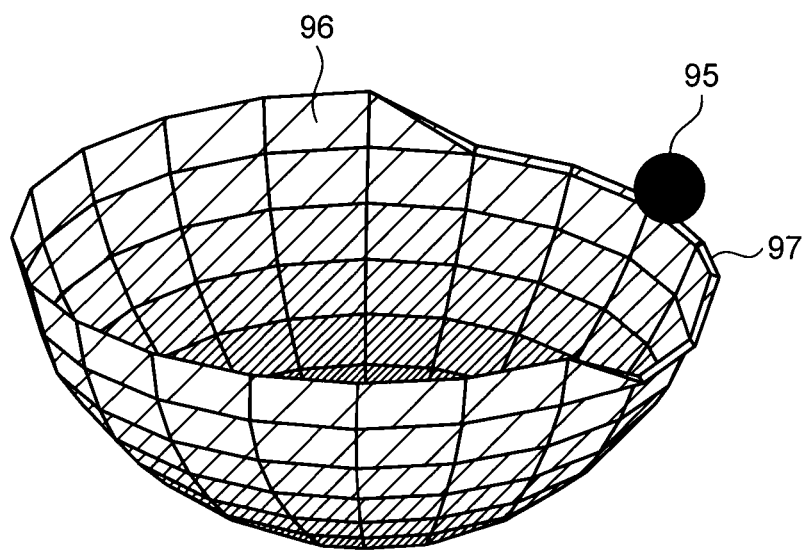
Figures 4, 8:
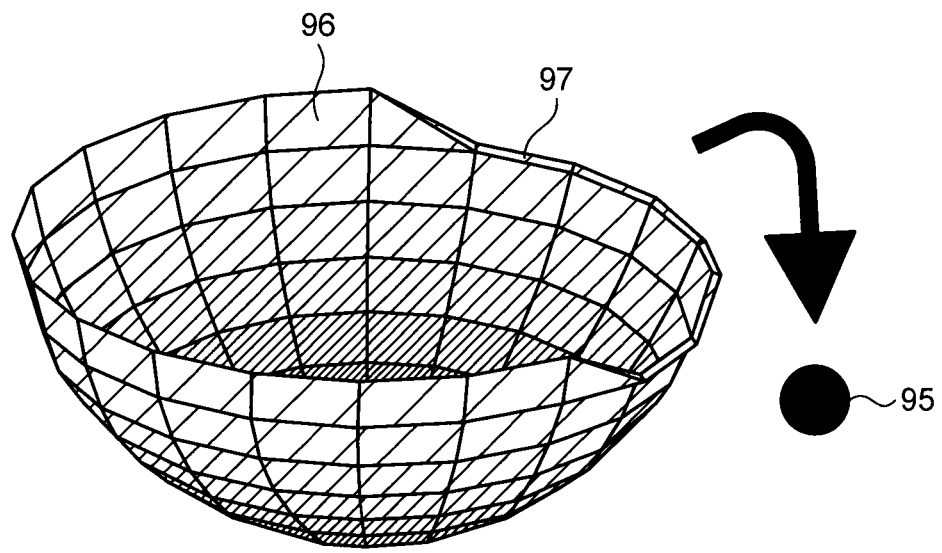

FIG. 8-1 is a conceptual view when travel control of a vehicle is performed by a conventional vehicle control device. FIG. 8-2 is an explanatory view illustrating a state that the vehicle more approaches a control limit than FIG. 8-1. FIG. 8-3 is an explanatory view illustrating a state that control is performed on the control limit at the time of controlled in the conventional vehicle control device. FIG. 8-4 is an explanatory view illustrating a state that the control limit is exceeded at the time of control in the conventional vehicle control device. Next, a difference between travel control of the vehicle 1 by the conventional vehicle control device and the travel control of the vehicle 1 by the vehicle control device 2 according to the embodiment will be explained. As shown in FIG. 8-1 to FIG. 8-4, when the travel control of the vehicle 1 by the conventional vehicle control device is explained by conceptual views by showing a behavior 95 of the vehicle 1 in such a manner that a behavior 95 of the vehicle 1 is shown by a sphere, a control range 96 is shown by a hemisphere, and a control limit 97 is assumed to be an edge portion of the hemisphere, in an ordinary travel state, control is performed so that the behavior 95 of the vehicle 1 is positioned inside of the control range 96 (FIG. 8-1). In the state, when, for example, the vehicle 1 travels along a curve, a load on the wheels 5 is increased and the behavior 95 of the vehicle 1 approaches the control limit 97 (FIG. 8-2).

Here, in a state that the load on the wheels 5 becomes large such as when, for example, a curvature of the curve becomes large, and the like, the control limit 97 becomes low and the behavior 95 of the vehicle 1 becomes likely to reach the control limit 97 (FIG. 8-3). In the travel control of the vehicle 1 by the conventional vehicle control device, since the travel control is performed in response to a travel state of the vehicle 1 at the time, when the behavior 95 of the vehicle 1 reaches the control limit 97 as described above, the vehicle 1 becomes a state that control of the behavior 95 has no allowance. Accordingly, the behavior 95 of the vehicle 1 exceeds the control limit 97 and the control becomes likely to be collapsed (FIG. 8-4).

Figures 1, 9:
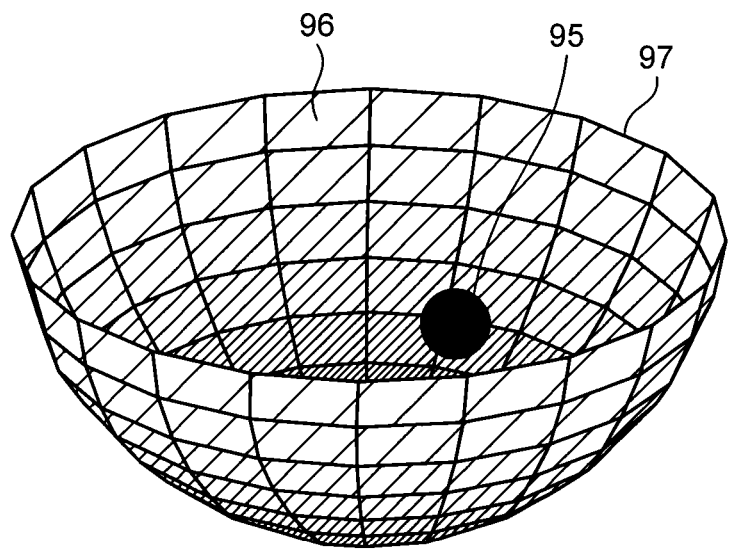
Figures 2, 9:
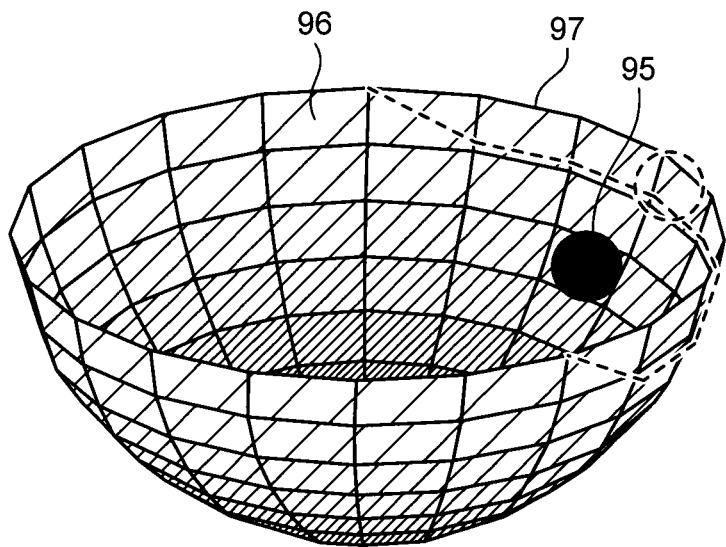
Figures 3, 9:
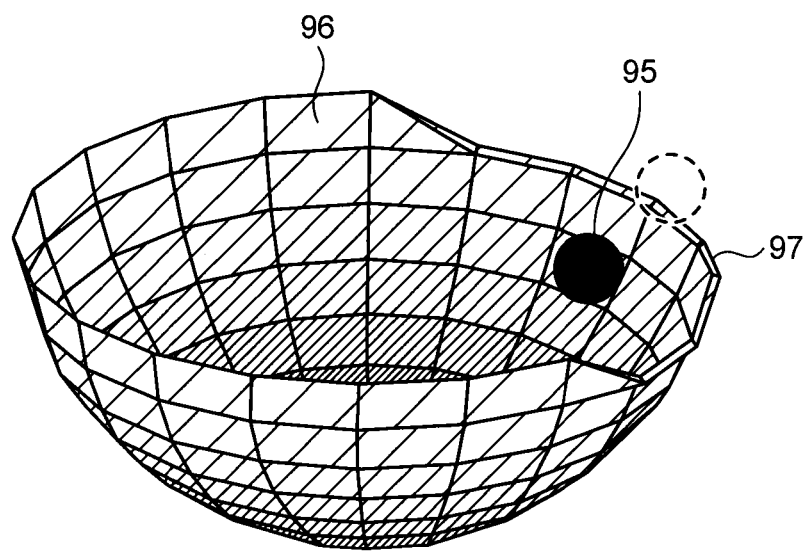
Figures 4, 9:
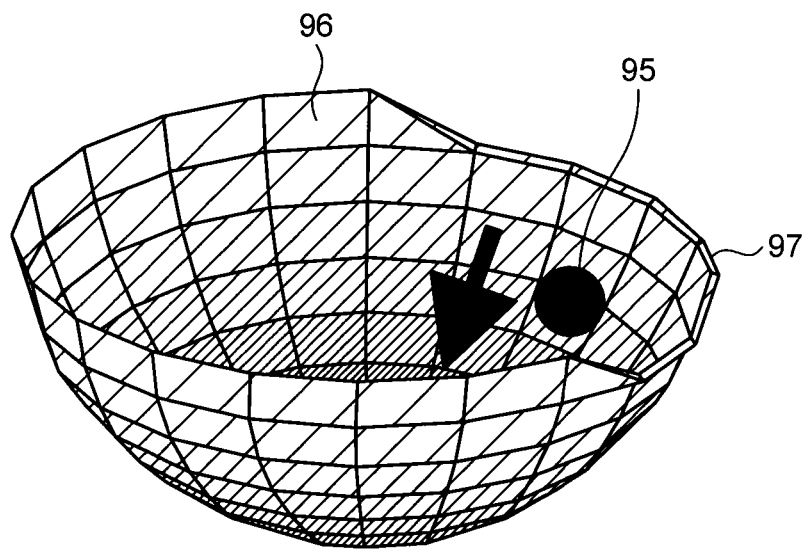

FIG. 9-1 is a conceptual view when the travel control of the vehicle is performed by the vehicle control device according to the embodiment. FIG. 9-2 is an explanatory view illustrating a state that the control limit is detected by the vehicle control device according to the embodiment. FIG. 9-3 is an explanatory view illustrating a state that the control limit has been detected by the vehicle control device according to the embodiment. FIG. 9-4 is an explanatory view illustrating a state that the control is performed by the vehicle control device according to the embodiment within a range of the control limit. With respect to the travel control of the vehicle 1 in the conventional vehicle control device, in the travel control of the vehicle 1 in the vehicle control device 2 according to the embodiment, control is performed so that the behavior 95 of the vehicle 1 is positioned inside of the control range 96 by guiding the vehicle 1 to a guide target point 93 other than the important target point 93a in an ordinary travel state (FIG. 9-1). In the ordinary travel state, although the control is performed so that the behavior 95 of the vehicle 1 is positioned inside of the control range 96 as described above, even in the case, the control limit 97 is detected by extracting the important target point 93a (FIG. 9-2).

When the vehicle 1 travels in the vicinity of the important target point 93a, although the vehicle 1 is forcibly guided to the important target point 93a, the important target point 93a acts as the guide target point 93 which can improve a safety of the vehicle 1. That is, since the important target point 93a acts as the guide target point 93 which can improve the degree of safety when the vehicle 1 travels, even when a low travel state exists in the control limit 97, it becomes difficult for the behavior 95 of the vehicle 1 to approach the control limit 97 by guiding the vehicle 1 to the important target point 93a (FIG. 9-3).

Even when the low travel state exists in the control limit 97 at the time of the travel control of the vehicle 1, since the behavior 95 of the vehicle 1 can be suppressed from approaching the control limit 97 by guiding the vehicle 1 to the important target point 93a as described above, the ordinary control state can be recovered without greatly disturbing the behavior 95 of the vehicle 1 (FIG. 9-4).

When the plural guide target points 93 are set on the ideal travel locus 91 and the vehicle 1 is caused to travel along the ideal travel locus 91, since the vehicle control device 2 does not perform the travel control for causing the vehicle 1 to travel perfectly along the ideal travel locus 91 and only guides the vehicle 1 to the guide target point 93, the vehicle 1 can be caused to approach a desired travel state without applying the uncomfortable feeling to the driver. As a result, appropriate travel control of the vehicle 1 can be performed without applying the uncomfortable feeling to the driver.

Further, the plural guide target points 93 are set on the ideal travel locus 91, and the degree of influence when the vehicle 1 is guided is made different by the important target point 93a and the approach target point 93b which are the guide target points 93. Among the target points, since the approach target point 93b has a low degree of influence when the vehicle 1 is guided, even when the progress path when the vehicle 1 is guided to the approach target point 93b is different from an intention of the driver, the vehicle 1 is not forcibly guided, and the travel control is performed permitting a travel which does not pass through the approach target point 93b. On the contrary, when the vehicle 1 is guided to the important target point 93a, since the important target point 93a has a high degree of influence when the vehicle 1 is guided, the vehicle 1 is forcibly guided as compared with the case when the vehicle 1 is guided to the approach target point 93b. When the vehicle 1 is guided to the important target point 93a and the vehicle 1 travels passing through the important target point 93a as described above, since the vehicle 1 travels along the ideal travel locus 91, the vehicle 1 can travel along an ideal travel locus when the vehicle 1 passes through the road 90 during traveling. As a result of them, the appropriate travel control of the vehicle 1 can be performed without applying the uncomfortable feeling to the driver.

Further, since the important target point 93a makes the degree of influence when the steering control of the vehicle 1 is performed higher than the approach target point 93b, when the vehicle 1 travels in the vicinity of the important target point 93a, the vehicle 1 can be caused to more reliably travel along the ideal travel locus 91. Further, since the important target point 93a acts as an important point when the vehicle 1 efficiently travels along the road 90 during traveling, when the driver passes through the vicinity of the important target point 93a, the driver is likely to travel toward the important target point 93a by an intention of himself or herself while paying attention to the important target point 93a, and thus even if the vehicle 1 is forcibly guided when the driver does not perform the drive operation for causing the vehicle 1 to travel toward the important target point 93a, the driver less feels uncomfortable. Accordingly, when the vehicle 1 passes through the important target point 93a, since the vehicle 1 can efficiently travel along the road 90 and the load on the wheels 5 and a loss of the drive force can be reduced, even if the vehicle 1 is guided to the important target point 93a while making the degree of influence when the steering control the vehicle 1 is performed high, the driver can comfortably drive the vehicle 1. As a result, the appropriate travel control of the vehicle 1 can be performed without applying the uncomfortable feeling to the driver.

Further, since the approach target point 93b acts as the guide target point 93 which makes it easy to guide the vehicle 1 to the important target point 93a and further the approach target point 93b acts as an important point when the vehicle 1 efficiently travels on the road 90 and the driver can easily pay attention to the approach target point 93*b*, even if the vehicle 1 is guided to the approach target point 93*b* likewise the important target point 93*a*, the driver less feels uncomfortable. Accordingly, the vehicle 1 can be guided to the important target point 93*a* more easily by guiding the vehicle 1 to the approach target point 93*b* by extracting the approach target point 93*b*. Further, since the approach target point 93*b* acts as a preparation point for guiding the vehicle 1 to the important target point 93*a* and its degree of importance is lower than the important target point 93*a*, even when the driver performs the drive operation which causes the vehicle 1 to be away from the approach target point 93*b*, the vehicle 1 is not forcibly guided to the approach target point 93*b*. Accordingly, the driver can be suppressed from feeling uncomfortable. As a result, the appropriate travel control of the vehicle 1 can be more reliably performed without applying the uncomfortable feeling to the driver.

Further, the important target point 93*a* acts as an important point when the vehicle 1 travels along the ideal travel locus 91 in a shortest time and the loss of the drive force and the load on the wheels 5 can be reduced by causing the vehicle 1 to pass through the important target point 93*a*. Accordingly, when the vehicle 1 travels along the ideal travel locus 91, the fuel economy can be improved and the degree of safety when the vehicle travels can be improved by that the vehicle 1 passes through the important target point 93*a*. In particular, when the ideal travel locus 91 is a travel locus aiming at the improvement of safety, an emergency avoidance capability can be improved by enlarging a safety allowance and further the vehicle 1 can turn smoothly with a sense of safety by causing the vehicle 1 to pass through the important target point 93*a* and to travel along the ideal travel locus 91. As a result of them, the appropriate travel control of the vehicle 1 can be more reliably performed.

Note that, in the vehicle control device 2 according to the embodiment, when the vehicle 1 does not reach the approach target point 93*b* at the time the vehicle 1 is guided to the approach target point 93*b*, and when the vehicle 1 passes through the approach target point 93*b* and is away from the ideal travel locus 91, although the travel control is performed in response to the drive operation of the driver, the approach target point 93*b* may be extracted again in the case. In the extraction of the approach target point 93*b* in the case, an intersecting point of the progress path 92 of the vehicle 1 during travelling and the ideal travel locus 91 is extracted by the target point extracting unit 83 provided with the drive schedule creating ECU 80 as the approach target point 93*b*, likewise the case that the approach target point 93*b*, to which the guided vehicle 1 does not reach, is extracted. As described above, when the approach target point 93*b* is extracted again, the vehicle 1 is guided toward the approach target point 93*b* by the vehicle guiding unit 84. As those described above, whether or not a path along which the vehicle 1 travels is the ideal travel locus 91 is determined by the vehicle guiding unit 84, and when the path along which the vehicle 1 is traveling is not the ideal travel locus 91, the approach target point 93*b* may be extracted until the vehicle 1 travels along the ideal travel locus 91 and the vehicle 1 may be guided toward the extracted approach target point 93*b* at a relatively low degree of influence.

Figure 10:
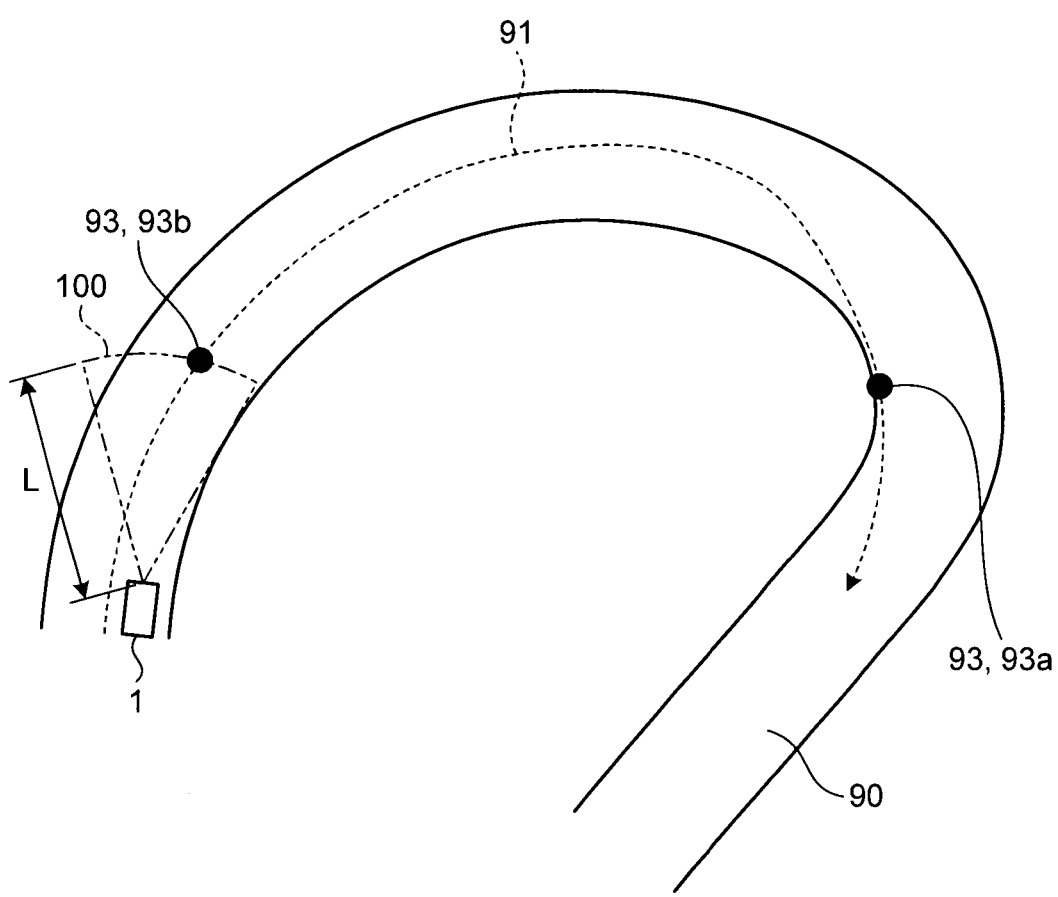
FIG. 10 is an explanatory view of a modified example when an approach target point is extracted.

Further, in vehicle control device 2 according to the embodiment, although the intersecting point of the progress path 92 of the vehicle 1 during travelling and the ideal travel locus 91 is extracted as the approach target point 93*b*, the approach target point 93*b* may be extracted by other method. FIG. 10 is an explanatory view of a modified example when the approach target point is extracted. The approach target point 93*b* may be extracted based on a forward gazing distance which is a distance when, for example, the driver gazes forward while the vehicle 1 is traveling. Here, ordinarily, since the driver gazes a position a predetermined time ahead in many times, the forward gazing distance can be shown by forward gazing distance $L=V\Delta t$ when the forward gazing distance is shown by L, the vehicle speed is shown by V, and the predetermined time is shown by $\Delta t$. Since the predetermined time $\mp t$ can be previously set, the forward gazing distance L is calculated by multiplying the vehicle speed V at the time by the predetermined time $\Delta t$, and the approach target point 93*b* may be set to a point determined by drawing a perpendicular line from an extreme end of the forward gazing distance L calculated as described above to the ideal travel locus 91. That is, as shown in FIG. 10, an intersecting point of an extreme end 100 of the forward gazing distance L and the approach target point 93*b* in a predetermined range ahead of the vehicle 1 may be extracted as the approach target point 93*b*.

The extreme end 100 of the forward gazing distance L becomes a portion which is likely to be gazed by the driver when the vehicle 1 travels and can be likely to be made to a target in the progress direction by the driver himself or herself when the driver performs the drive operation of the vehicle 1. Accordingly, the vehicle 1 can be guided to the ideal travel locus 91 without the uncomfortable feeling by extracting the intersecting point of the extreme end 100 of the forward gazing distance L and the ideal travel locus 91 as the approach target point 93*b* and guiding the vehicle 1 to the approach target point 93*b* extracted as described above. With the operation, the appropriate travel control of the vehicle 1 can be performed without applying the uncomfortable feeling to the driver.

Further, when the vehicle 1 is provided with an eye line recognition means such as an eye camera (illustration is omitted) capable of recognizing an eye line of the driver, a driver gazing model capable of estimating the eye line of the driver in response to the drive operation of the driver, and the like, an intersecting point of a line extending in a direction of the eye line of the driver and the ideal travel locus 91 may be extracted as the approach target point 93*b*. In general, when the vehicle travels, in particular, when the vehicle travels toward a curve, the driver directs eyes toward a target point when the vehicle 1 is caused to travel. Accordingly, since the vehicle 1 can be guided without the uncomfortable feeling by guiding the vehicle 1 by extracting an intersecting point of the direction of the eye line of the driver and the ideal travel locus 91 as the approach target point 93*b*, the appropriate travel control of the vehicle 1 can be performed without applying the uncomfortable feeling to the driver.

Further, in the vehicle control device 2 according to the embodiment, although the important target point 93*a* and the approach target point 93*b* are extracted as the guide target points 93, the guide target points 93 may be extracted using target points other than the important target point 93*a* and the approach target point 93*b* as the guide target points 93. The plural guide target points 93 are set on the ideal travel locus 91, and when the degree of influence at the time the vehicle 1 is guided is different at the guide target points 93, the target points other than the important target point 93*a* and the approach target point 93*b* may be extracted as the guide target points 93.

Further, when the vehicle 1 travels along a portion of a curve, since the driver is likely to gaze a portion where a curvature of the curve changes and an initial end of the curve, that is, a portion where a straight line changes to a curved line, the guide target points 93 may be set to these portions. That is, the driver is likely to set the portion which the driver is likely to gaze such as the portion at which the curvature changes as the target point when the vehicle 1 travels. Accordingly, the vehicle 1 can be guided without the uncomfortable feeling by extracting the guide target point 93 on the ideal travel locus 91 which is set to the portion that is likely gazed in the road 90 along which the vehicle 1 is traveling and guiding the vehicle 1 to the guide target point 93.

Further, when the guide target point 93 is extracted on the ideal travel locus 91 to which the curve of the road 90 is set as described above, it is preferable to change the degree of influence in response to the curvature of the ideal travel locus 91 at the position where the guide target point 93 is set. That is, as the curvature of the ideal travel locus 91 to which the guide target point 93 is set becomes larger, it is preferable to increase a compelling force when the vehicle 1 is guided to the guide target point 93.

Further, when the guide target points 93 are extracted, it is preferable to increase the degree of influence of the guide target point 93 which is set to the portion at which the curvature of the ideal travel locus 91 changes. That is, when the guide target points 93 are extracted, it is preferable to relatively increase the compelling force when the vehicle 1 is guided to the guide target point 93 set to the portion in which the curvature of the ideal travel locus 91 changes such as the portion connecting from a straight line to the curve of the road 90.

In the portion in which the curvature is large, a degree of danger at the time of travelling of the vehicle 1 is increased by that the side slip is likely to occur when the vehicle 1 travels, and further the degree of danger is increased also in a portion in which the curvature changes because a behavior of the vehicle 1 during travelling changes. Accordingly, a safety when the vehicle 1 travels can be more increased by increasing the compelling force when the vehicle 1 is guided to the guide target point 93 set to the portion. As a result of them, the appropriate travel control of the vehicle 1 can be more reliably performed without applying the uncomfortable feeling to the driver.

Further, when the speed of the vehicle 1 is fast, since a gazing point of the driver becomes far than when the speed is slow, a target point of the driver when the vehicle 1 travels becomes farther than when the speed is slow. Accordingly, when the guide target points 93 are extracted, it is preferable to increase the degree of influence of the guide target point 93 set far from the vehicle 1 as the vehicle speed becomes faster. Thus, since the compelling force when the vehicle 1 is guided to the guide target point 93 set far from the vehicle 1 can be increased, the vehicle 1 can be guided in a state near to a drive intention of the driver. As a result, the appropriate travel control of the vehicle 1 can be more reliably performed without applying the uncomfortable feeling to the driver.

Further, when a road width is narrow, since the vehicle 1 is likely to travel along an edge of the road such as a vicinity of a road shoulder of the road 90 and the degree of danger is increased, it is preferable to increase the degree of influence of the guide target point 93 set to a position near to a center of the road width, as the road width of the road 90 along which the vehicle 1 travels becomes narrow. As described above, when the road width is narrow, since the vehicle 1 can be guided near to the center of the road width by increasing the compelling force when the vehicle 1 is guided by increasing the degree of influence of the guide target point 93 near to the center of the road width, the safety when the vehicle 1 travels can be more increased. On the contrary, when, for example, the vehicle 1 travels along a curve at the time the road width is wide, the vehicle 1 can be caused to travel efficiently by setting the guide target point 93 on a travel locus which is ordinarily made ideal such as setting the guide target point 93 on the out-in-out locus. As a result of them, the appropriate travel control of the vehicle 1 can be more reliably performed without applying the uncomfortable feeling to the driver.

Further, when the vehicle 1 travels, the degree of danger changes in response to a travel state because a position where the vehicle 1 travels is near to the road shoulder of the road 90, the friction coefficient µ becomes low or the friction coefficient µ changes due to freezing of a road surface, and the position is near to other traffic means such as other vehicle in addition to that a magnitude of a curvature of a curve and the curvature change. Accordingly, when it is detected by the radar 60 and the like that the degree of danger is in a high state because other vehicle is detected, and the like, it is preferable to reduce, among the guide target points 93, the degree of importance of guide target points 93 set to the portions where the degree of danger is high so that the degree of influence when the vehicle 1 is guided to the guide target point 93 is reduced. With the operation, when the vehicle 1 is caused to travel along the ideal travel locus 91, since the compelling force, when the vehicle 1 is guided to the guide target point 93 set to the portion where the degree of danger is high, is reduced, when the driver performs the drive operation for avoiding the portion having the high degree of danger, the vehicle 1 can be suppressed from being forcibly guided to the portion having the high degree of danger. Further, since the vehicle 1 is guided to the guide target point 93 by making the degree of influence when the vehicle 1 is guided to the guide target point 93 different in response to the degree of danger as described above, an avoidance of the travel state in which the degree of danger is high and control for causing the vehicle 1 to travel along the ideal travel locus can be achieved at the same time smoothly. As a result, the appropriate travel control of the vehicle 1 can be more reliably performed without applying the uncomfortable feeling to the driver.

Further, when the drive force is turned OFF at the time of wave-like travel, the clutch is preferably released. Further, when the drive device 10 is provided with a planetary gear (illustration is omitted), switching of transmission and shut-off of power between the engine 12 and drive wheel side can be permitted by switching an operation of the planetary gear, and when the drive force is turned OFF at the time of wave-like travel, the turn-OFF may be realized by switching the planetary gear. As described above, a means for switching the transmission and the shut-off of the power between the engine 12 and drive wheel side may employ any mode as long as the means is provided so as to shut off a rotation between the drive wheel side and the engine 12 when the drive force is turned OFF at the time of wave-like travel.

Further, when the vehicle 1 is guided to the guide target point 93, the vehicle may be guided using a method other than controlling the vehicle speed and controlling the VGRS. The vehicle 1 may be guided by providing, for example, a stabilizer 40, which connects right and left suspension units of the vehicle 1 with a stabilizer actuator 45 which can adjust a transmission rate when a motion of the wheels 5 in an up/down direction is transmitted between the right and left wheels 5, and by adjusting the transmission rate. Since the loads applies to the right and left wheels 5 and to the front and rear wheels 5 can be adjusted by controlling the stabilizer actuator 45 and a turning ability of the vehicle 1 to the steering angle changes, an actual turning ability can be made to a desired turning ability. With the operation, the vehicle 1 can be guided to the guide target point 93.

Further, although the ideal travel locus 91 is calculated as the locus which causes the vehicle 1 to efficiently travel along the road 90, the ideal travel locus 91 may be calculated based on a point of view other than efficiency. For example, a travel locus which has a low degree of danger and permits a safety travel may be calculated as the ideal travel locus 91. Further, a target other than the locus may be calculated as the target for performing the travel control of the vehicle 1 as described above. That is, a region having a predetermined range may be calculated as the target travel region which is a travel region that becomes a target when the travel control of the vehicle 1 is performed in place of the locus shown by a line. In the case, the guide target points 93 are disposed on the target travel region, and the degree of influence of the guide target points 93 when the vehicle 1 is guided is made different. As a result, since the vehicle 1 can be guided to the target travel region and can be caused to travel within the target travel region in a range in which no uncomfortable feeling is applied to the driver, the appropriate travel control of the vehicle 1 can be performed.

INDUSTRIAL APPLICABILITY

As described above, the vehicle control device according to the present invention is useful to a vehicle which can further apply desired travel control to travel control by a drive operation of a driver and in particular is suitable for a vehicle to which appropriate control is applied in response to a road on which the vehicle travels.

REFERENCE SIGNS LIST

1 VEHICLE
2 VEHICLE CONTROL DEVICE
5 WHEEL
10 DRIVE APPARATUS
12 ENGINE
15 AUTOMATIC TRANSMISSION
50 BRAKE HYDRAULIC PRESSURE CONTROL UNIT
65 CAR NAVIGATION SYSTEM
70 MOTION CONTROL ECU
80 DRIVING SCHEDULE CREATING ECU
90 ROAD
91 IDEAL TRAVEL LOCUS
92 PROGRESS PATH
93 GUIDE TARGET POINT
93a IMPORTANT TARGET POINT
93b APPROACH TARGET POINT

The invention claimed is:

1. A vehicle control device that performs travel control of a vehicle by setting a target travel region that is a travel region that becomes a target at the time the travel control is performed, the vehicle control device comprising:
an electronic control unit (ECU);
a target point extracting unit executed by the ECU and configured to set a plurality of target positions for guiding the vehicle on the target travel region at the time the travel control is performed, and extract a plurality of guide target points as points set on a speed pattern capable of realizing a travel of the vehicle in the target travel region by an actuator used to the travel of the vehicle, each of the plurality of guide target points corresponding to each of the plurality of target positions; and
a vehicle guide unit executed by the ECU and configured to guide the vehicle by setting a degree of influence at the time the vehicle is guided at an important target point which is one of the guide target points among the plurality of guide target points higher than the other guide target points so as to weight a compelling force at the time the vehicle is guided to the important target point higher than the other guide target points, and by controlling the actuator based on the speed pattern, at the time the vehicle is guided to the target positions, and set again the target position and guide the vehicle, at the time a path along which the vehicle being guided travels is not the target travel region,
wherein, as a speed of the vehicle becomes fast, the plurality of the target positions increase the degree of influence of the target position set far from the vehicle.

2. The vehicle control device according to claim 1, wherein the plurality of the target positions make the degree of influence different at the time steering control of the vehicle is performed.

3. The vehicle control device according to claim 1, wherein the target travel region is set as a target locus that is a locus along which the vehicle travels, and
the plurality of the target positions make the degree of influence different in response to a curvature of the target locus at a position where the target position is set.

4. The vehicle control device according to claim 1, wherein the plurality of the target positions increase the degree of influence of the target position set to a portion near to a position at which a driver gazes.

5. The vehicle control device according to claim 1, wherein the target travel region is set as a target locus that is a locus along which the vehicle travels, and
the plurality of the target positions increase the degree of influence at the target position set to a portion where a curvature of the target locus changes.

6. The vehicle control device according to claim 1, wherein as a road width of a road along which the vehicle travels becomes narrow, the plurality of the target positions increase the degree of influence of the target position set at a position near to a center of the road width.

7. The vehicle control device according to claim 1, wherein the plurality of the target positions reduce the degree of influence of the target position set to a portion having a high degree of danger.

8. The vehicle control device according to claim 1, wherein at the time the vehicle travels at a first speed, the degree of influence of the target position set to a first position from the vehicle is a first degree of influence, and
wherein when the vehicle travels at a second speed greater than the first speed, the degree of influence of the target position set to a second position from the vehicle that is greater than the first position, is a second degree of influence greater than the first degree of influence.

9. A vehicle control device that performs travel control of a vehicle by setting a target travel region that is a travel region that becomes a target at the time the travel control is performed, the vehicle control device comprising:
an electronic control unit (ECU);
a target point extracting unit executed by the ECU and configured to set a plurality of target positions for guiding the vehicle on the target travel region at the time the travel control is performed, and extract a plurality of guide target points as points set on a speed pattern capable of realizing a travel of the vehicle in the target travel region by an actuator used to the travel of the vehicle, each of the plurality of guide target points corresponding to each of the plurality of target positions, where at the time the target travel region is a single curve having an angle of 180° or more, the target point extracting unit divides the curve into two portions which are an anterior half portion and a latter half portion of the curve, extracts an important target point among the plurality of guide target points which is one of the guide target points at an inside of the curve in the latter half portion of the curve, and extracts an approach target points among the plurality of guide target points which is one of the guide target points at a portion on an outside of an out-in-out travel locus in the target travel region on a proximal side of the important target point in a progress direction of the vehicle, as a point at which the vehicle can be easily guided to the important target point; and a vehicle guide unit executed by the ECU and configured to guide the vehicle by setting a degree of influence at the time the vehicle is guided at the important target point among the plurality of guide target points higher than the approach target point, so as to weight a compelling force at the time the vehicle is guided to the important target point higher than the approach target point, and by controlling the actuator based on the speed pattern, at the time the vehicle is guided to the target positions, and set again the target position and guide the vehicle, at the time a path along which the vehicle being guided travels is not the target travel region, wherein, as a speed of the vehicle becomes fast, the plurality of the target positions increase the degree of influence of the target position set far from the vehicle.

* * * * *